(12) United States Patent
Streiter

(10) Patent No.: US 6,249,728 B1
(45) Date of Patent: Jun. 19, 2001

(54) ACTIVE SUSPENSION SYSTEM FOR A VEHICLE

(75) Inventor: Ralph Streiter, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/451,836

(22) Filed: Dec. 1, 1999

(30) Foreign Application Priority Data

Dec. 1, 1998 (DE) .............................................. 198 55 310

(51) Int. Cl.⁷ ........................ B60G 17/015; B60G 23/00
(52) U.S. Cl. ........................ 701/37; 701/38; 280/5.507; 280/5.514
(58) Field of Search ........................ 701/37, 38; 280/5.5, 280/5.507, 5.508, 5.513

(56) References Cited

U.S. PATENT DOCUMENTS

| | | | |
|---|---|---|---|
| 5,062,660 | 11/1991 | Satoh et al. | 280/707 |
| 5,189,615 | 2/1993 | Rubel et al. | 364/424.05 |
| 5,401,053 | 3/1995 | Sahm et al. | 280/707 |
| 5,475,593 | * 12/1995 | Townend | 364/424.05 |
| 5,619,413 | * 4/1997 | Oakley | 364/424.046 |
| 5,743,553 | 4/1998 | Nagel et al. | 280/707 |
| 6,000,702 | 12/1999 | Streiter | 280/5.507 |

FOREIGN PATENT DOCUMENTS

| | | |
|---|---|---|
| 39 32 476 | 4/1990 | (DE) . |
| 40 26 790 | 10/1991 | (DE) . |
| 42 31 641 | 3/1994 | (DE) . |
| 43 03 160 | 8/1994 | (DE) . |
| 44 14 022 | 10/1995 | (DE) . |
| 196 15 737 | 10/1997 | (DE) . |

* cited by examiner

Primary Examiner—William A. Cuchlinski, Jr.
Assistant Examiner—Yonel Beaulieu
(74) Attorney, Agent, or Firm—Evenson, McKeown, Edwards & Lenahan, P.L.L.C.

(57) ABSTRACT

An active suspension system for vehicles, particularly motor vehicles, has active supporting assemblies which are arranged between the vehicle body and the vehicle wheels. Each of the assemblies includes a passive spring as well as a lift-adjustable control unit arranged in series thereto. The supporting assemblies are controlled as a function of body accelerations of the vehicle, and low-frequency and higher-frequency fractions of body accelerations, which are taken into account differently. As a result, the vehicle follows the road profile comparatively directly while the comfort is good.

9 Claims, 3 Drawing Sheets

ACTIVE SUSPENSION SYSTEM FOR A VEHICLE

BACKGROUND AND SUMMARY OF THE INVENTION

This application claims the priority of German patent document DE 198 55 310.2, filed Dec. 1, 1998, the disclosure of which is expressly incorporated by reference herein.

The present invention relates to an active suspension system for vehicles, particularly motor vehicles, having supporting assemblies which are arranged between the vehicle body and the vehicle wheels, with each supporting assembly having an actively lift-adjustable control unit and a passive spring arranged in series thereto, and having an automatic control of the control units. A path generator for generating a signal correlated with the lift position of the supporting assembly is assigned to each supporting assembly, and a sensor arrangement for generating signals which are correlated at least with vertical body accelerations is assigned to the vehicle body. Control signals used for controlling the control units have a signal fraction generated by the signals of the above-mentioned sensor arrangement.

German Patent Document DE 40 26 790 C1 illustrates a computer-controlled suspension system for motor vehicles. In this case, a control intervention, which is a function of the frequency of the suspension lifts, takes place such that, at the frequency which is characteristic of a vehicle body resonance, an increased damping of vehicle body motion will occur.

From German Patent Document DE 39 32 476 A1, a suspension system is known which has hydropneumatic spring and supporting assemblies and in which a passive spring is formed by a pneumatic spring load device. This spring load device is hydraulically connected with a piston working space of a piston-cylinder unit arranged between the sprung and the unsprung masses, in which case the "hydraulic linkage" formed by the hydraulic connection can be lengthened or shortened by feeding and removing hydraulic medium. The control signals for the control units comprise, among others, fractions which are determined by the longitudinal and lateral acceleration of the vehicle body as well as additional fractions which depend on the lifting path of the unsprung mass relative to the sprung mass as well as on the vertical acceleration of the sprung mass.

According to European Patent Document EP 0 395 114 A1, in a hydropneumatic suspension system, the suspension assemblies are controlled by a roll and pitch compensation, in which case pitch and roll motions of the vehicle body, or forces leading to corresponding motions of the body, are detected by vehicle-body-side sensors for longitudinal and lateral acceleration.

German Patent Documents DE 42 31 641 A1 and DE 44 14 022 A1 show active suspension systems, in each of which a passive mechanical spring is arranged in series with a hydraulic control assembly. According to each of these systems, the "hydraulic linkage" is combined with a mechanical spring.

According to German Patent Document DE 196 15 737 A1, in an active suspension system of a motor vehicle, vehicle body accelerations are detected in order to determine therefrom a measurement for deformation of the tires. In this manner, a comparatively exact measurement of the clearance of the vehicle body from the ground can be determined; on the one hand, the distances between the vehicle body and the vehicle wheels and, on the other hand, the conditions of the tire springs are taken into account. As a result, a realistic value of the clearance from the ground can be used as the command variable when controlling the spring system.

In addition, it is known, for example, from German Patent Document DE 43 03 160 A1 to arrange, in vehicles, between the vehicle body and the wheel, in each case only an active force generator without any passive spring arranged in series thereto, and to carry out the control as a function of parameters to be monitored by a desired-value actual-value comparison. In systems of this type, the reactivity of the force generator as well as of the control systems must be extremely high. Otherwise, an uncomfortable suspension behavior would be obtained.

It is an object of the invention to provide an active suspension system in which a special reaction to vehicle body accelerations takes place.

According to the invention, this object is achieved in that a signal fraction produced by the sensor arrangement for the vehicle body accelerations causes, for higher-frequency fractions of vertical vehicle body accelerations above a limit frequency, an adjustment of the control units reducing the respective vehicle body acceleration and, for lower frequency fractions of the vehicle body acceleration below the same or another limit frequency, an adjustment of the control units which, with respect to its amount, is reduced or imperceptible, or is opposite.

The invention is based on the general idea of processing vehicle body accelerations while taking into account their frequency spectrum. In this case, the fact is taken into account that a considerable portion of higher-frequency fractions of the vehicle body accelerations are caused by road surface unevennesses with short wavelengths, while very low-frequency fractions of the vehicle body accelerations are caused predominantly by road surface contours with very large wavelengths or by curves in the driving route, lateral gradients of the driving route in the areas of curves, and the like. As a result of the frequency-dependent consideration of the vehicle body accelerations, on the one hand, a good comfort can be achieved in that, at higher-frequency vehicle body motions, a comfort-promoting flexibility of the suspension can be ensured. On the other hand, the invention ensures secure handling of the vehicle in that vehicle body motions caused by long-wave road contours are not diminished or are diminished in a reduced manner, so that the vehicle body can maintain a defined desired position relative to the average road contour in a comparatively stable fashion.

In addition, according to a particularly preferred embodiment of the invention, while taking into account the vehicle body accelerations, for the control signals of the control assemblies, a signal fraction is also determined which is correlated with the condition of the tire springs of the vehicle wheels. If, during a drive, the payload of a vehicle remains immobile relative to the vehicle body and the inert mass of the vehicle wheels as well as of the wheel suspensions is low in comparison to the mass of the vehicle body, then the vehicle body accelerations are predominantly determined only by forces effective between the driving route and the vehicle body which are transmitted by way of the wheels and thus the tire springs and correspondingly, at least to a large extent, also determine the condition of the tire springs.

With respect to preferred characteristics of the invention, reference is made to the claims as well as to the following explanation of the drawings by which expedient embodiments of the invention are described.

DESCRIPTION OF THE PREFERRED EMBODIMENTS

Figure 1:
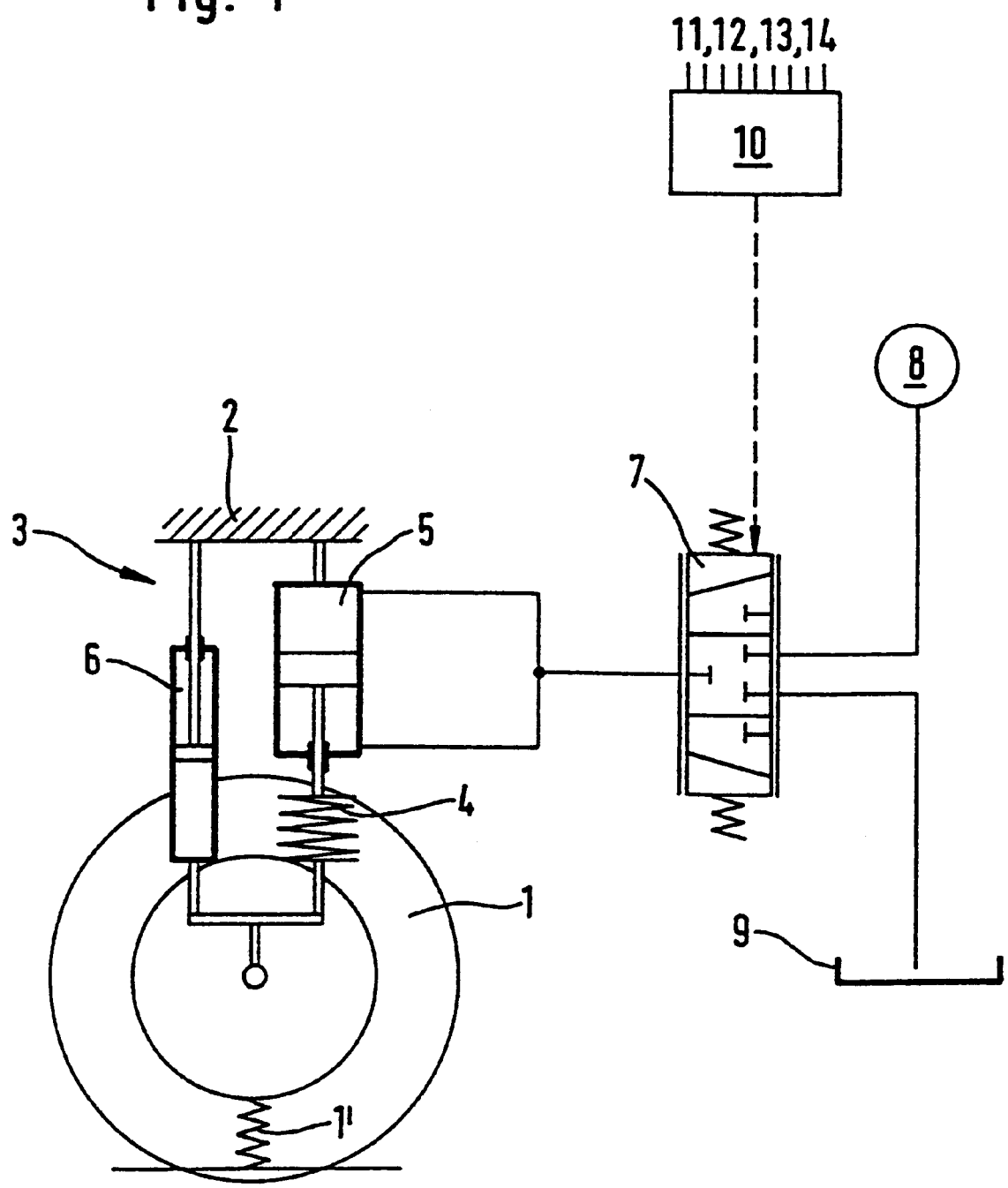
FIG. 1 is a schematic basic diagram of a supporting assembly.

According to FIG. 1, a supporting assembly 3 is arranged between a wheel 1 and the body 2 of a vehicle, which supporting assembly 3 in each case has a passive spring 4 as well as a hydraulic assembly 5 arranged in series thereto. By means of the hydraulic assembly, the body-side abutment of the spring can be vertically adjusted relative to the vehicle body 2.

A shock absorber 6 is arranged in parallel to the spring 4. According to FIG. 1, this shock absorber 6 is provided between the wheel 1 and the vehicle body 2. However, in principle, it is also conceivable to arrange this shock absorber 6 between the wheel 1 and the hydraulic assembly 5 in parallel to the spring 4. The arrangement of the shock absorber 6 illustrated in FIG. 1 offers the possibility of constructing the shock absorber 6 with a greater length. In an arrangement with the shock absorber 6 between the wheel 1 and the hydraulic assembly 5, it is advantageous that, during the adjustment, the hydraulic assembly 5 does not have to operate against the resistance of the shock absorber 6.

By way of a control valve arrangement 7, the hydraulic assembly 5 is controllably connected with a hydraulic pressure source 8. This may, for example, be a pressure reservoir which is regularly recharged by a pump which is not shown.

The control valve arrangement 7 is operated by an electronic control circuit 10 in a manner indicated below.

Figure 2:
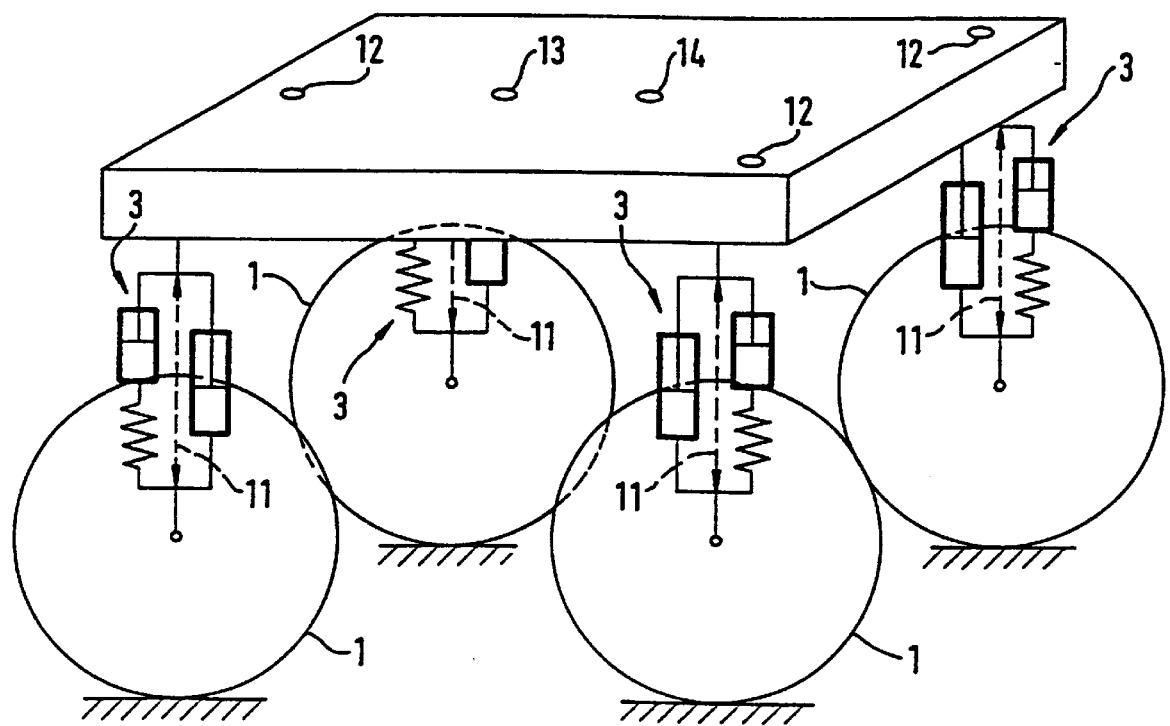
FIG. 2 is a schematic representation of a vehicle having a suspension system according to the invention.

According to FIG. 2, a path generator 11 is assigned to each wheel 1 or each supporting assembly 3, the signal of the path generator 11 being correlated with the distance between the respective wheel 1 and the vehicle body structure 2. The path generators 11 may have any construction. For example, lift sensors may be provided which directly detect the distance between the center of the wheel 1 and the vehicle body 2. Instead, angle generators may also be provided which detect, for example, the swivelling angle of a link used for the wheel suspension relative to the vehicle body 2. The extent of such a swivelling angle is a measurement for the distance between the wheel 1 and the vehicle body 2.

On the vehicle body 2, several acceleration sensors 12 are provided by which vehicle-body-side vertical accelerations can be detected. As a result, the control circuit 10 can determine accelerated lift motions of the vehicle body and, optionally, accelerated pitch or roll motions, that is, rotational motions of the vehicle body 2 about its transverse or longitudinal axis. In addition, sensors 13 and 14 can directly record longitudinal and lateral accelerations of the vehicle body 2.

As a result, signals are available for accelerations of the vehicle body in the longitudinal, lateral and vertical directions as well as for accelerated rotating motions with respect to the longitudinal, lateral and vertical axes.

Figure 3:
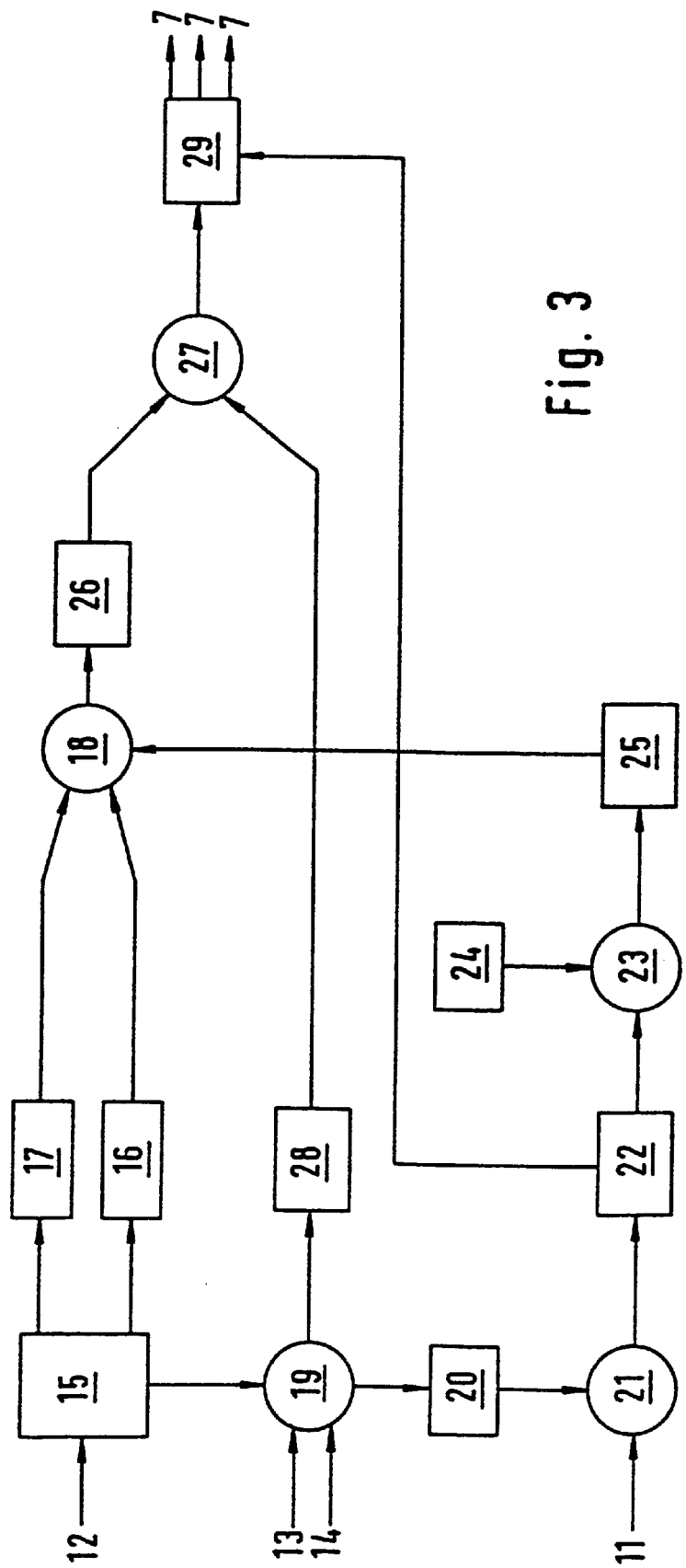
FIG. 3 is a block diagram of the automatic control for the lift-adjustable control units of the supporting assemblies.

According to FIG. 3, the signals of the sensors 12 for the vertical acceleration of the vehicle body 2 are processed by a circuit unit 15 such that, on the output side of this unit 15, signals are present for lift acceleration, pitch acceleration as well as roll acceleration of the vehicle body 2. On the one hand, these signals are fed to an amplifier 16 and, on the other hand, they are fed to a low-pass filter 17 arranged in parallel thereto. In this case, the amplifier 16 with the negated output operates such that the output signals of the amplifier 16 and of the low-pass filter 17 are linked to one another in the sense of subtraction by a summation circuit 18 on the output side.

When a vehicle body acceleration takes place in the upward direction, the output signals of the amplifier 16 represent a command for shortening one or several of the hydraulic assemblies 5. In a vehicle body acceleration in the downward direction, the output signals of the amplifier 16 represent commands for lengthening of one or several of the hydraulic assemblies 5. As a result, the above-mentioned control signals can be understood to be control commands for the reduction or damping of vehicle-body-side vertical accelerations.

The output signals of the low-pass filter 17 represent commands which are inverse to the output signals of the amplifier 16 but which, because of the low-pass effect of the filter 17, are generated only for low-frequency fractions of the vehicle body acceleration.

When the output signals of the amplifier 16 and of the low-pass filter 17 are linked with one another in the summation circuit 18, signal fractions are obtained on the output side of the summation circuit 18 which are modulated as a function of the frequency, with the result that a correspondingly frequency-dependent damping of vertical vehicle body accelerations is permitted. In this case, it is determined by the elements 16, 17 and 18 which frequency vertical vehicle body accelerations are taken into account when controlling the control assemblies 5 or play an increased role.

In addition, the output signals of the circuit unit 15 are fed to a summation circuit 19 to which the signals of the sensor arrangements 13 and 14 for the lateral and longitudinal acceleration of the vehicle body are also fed. On the output side of the summation circuit 19, signals are therefore present which reflect the exterior forces affecting the vehicle body 2, as long as motions of the payload or of the occupants of the vehicle during the drive can be neglected. In the case of a road vehicle, these exterior forces must virtually completely become effective at the wheels 1 and result in an analogous compression or deforming of the tires or tire springs 1' of the wheels 1.

By way of a circuit unit 20, the output signals of the summation circuit 19 can now be transformed into those signals which reflect the compression condition of the tire springs 1'.

These signals are fed to a summation circuit 21 and are linked there with the signals of the path generators 11 such that signals are present on the output side which are correlated with the clearances of the vehicle body 2 from the ground at the respective wheels 1. In their totality, these signals therefore represent information concerning the position of the vehicle body 2 relative to the road.

In the circuit unit 22, these signals are transformed such that signals are available on the output side which are coupled with the actual value of the average distance of the vehicle body 2 from the ground, the actual value of the roll angle as well s the actual value of the pitch angle of the vehicle body 2.

The above-mentioned signals are now fed to a summation circuit 23 which receives desired-value signals from the desired-value generators 24 for the average distance from the ground as well as the pitch angle and the roll angle of the vehicle body 2 and carries out a desired-actual value comparison. As a result, the summation circuit 23 generates signals on the output side which represent the desired-actual value deviations of the actual position of the vehicle body 2 with respect to its desired position.

The output signals of the summation circuit 23 are then processed in a circuit unit 25 in the sense of a proportional-plus-integral control.

The output signals of the circuit unit 25 are combined in the summation circuit 18 with the output signals of the amplifier 16 as well as of the low-pass filter 17 so that, on the output side of the summation circuit 18, a totality of signals is available which, on the one hand, comprises the desired countermeasures against vehicle body motions relative to an earth-fixed reference systems and, on the other hand, comprises countermeasures for compensation of vehicle body accelerations.

The output signals of the summation circuit 18 may travel through a low-pass filter 26 in order to avoid vehicle body vibrations caused by engine vibrations or by imbalances of the wheels 1 or the like from being taken into account when generating the control signals for the control valve arrangements 7.

Behind the low-pass filter 26, another summation circuit 27 is preferably arranged which, in addition to the output signals of the low-pass filter 26, receives the output signals of a differentiating arrangement 28 which, on the input side, receives the output signals of the summation circuit 19. Correspondingly, the output signals of the differentiating arrangement 28 represent the change of those signals which are correlated with the exterior forces and moments acting upon the vehicle body 2.

The output signals of the summation circuit 27 correspondingly contain signal fractions which are defined by the motion velocities of the vehicle body 2. In addition, the output signals of the summation circuit 27 contain signal fractions which are determined by the outer moments and forces acting upon the vehicle. Finally, signal fractions exist which are defined by the deviation of the actual position of the vehicle body relative to the ground with respect to a corresponding desired position.

These signals are now fed to an end stage 29 and are transformed there into electric control currents for the control magnets of the control valve arrangements 7 of the wheels 1 of the vehicle.

It is optional to control adjusting motions of the hydraulic assemblies 5 for the compensation of rolling motions of the vehicle body 2 differently at the front and rear wheels of the vehicle.

The circuit unit 22 preferably also generates signals which are correlated with the distances of the body 2 from the ground at mutually diagonally opposite wheels 1 (for example, right front wheel and left rear wheel). These signals represent information concerning the extent and the direction of the twisting of the vehicle body. These signals are then taken into account by the end stage 29 when compensating the roll; that is, when the control assemblies 5 are controlled for the compensation of rotating motions of the vehicle body 2 about its longitudinal axis.

Optionally, when compensating the roll, the end stage 29 can control the control assemblies 5 such that the supporting forces provided for compensating the roll are distributed, in a manner which probably can be defined as a function of parameters, to the front and rear wheels of the motor vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Active suspension system for vehicles, comprising:

supporting assemblies which are arranged between a vehicle body and vehicle wheels, an actively lift-adjustable control unit and a passive spring arranged in series thereto with which each of the supporting assemblies is provided, an automatic control of the control units, a path generator for generating a signal correlated with a lift position of the supporting assembly which is assigned to each of the supporting assemblies, and a sensor arrangement for generating signals which are correlated at least with vertical body accelerations being assigned to the vehicle body, wherein control signals used for controlling the control units have a signal fraction generated by the signals generated by the sensor arrangement, and wherein the signal fraction causes, for higher-frequency fractions of the vertical vehicle body accelerations above a limit frequency, adjustment of the control unit which reduces the respective body acceleration, and, for low-frequency fractions of the body accelerations, adjustment of the control units which, with respect to its extent, is at least one of reduced, imperceptible and opposed.

2. Suspension system according to claim 1, wherein signals, which reflect accelerations of the vehicle body, are fed to an amplifier as well as to a low-pass filter which is parallel thereto, and wherein output signals of the amplifier and of the low-pass filter are subtractively coupled with one another.

3. Suspension system according to claim 2, wherein the amplifier and the low-pass filter have the same amplification factors.

4. Suspension system according to claim 2, wherein the amplifier has a larger amplification factor than the low-pass filter.

5. Suspension system according to claim 2, wherein the amplifier has a lower amplification factor than the low-pass filter.

6. Suspension system according to claim 2, wherein said accelerations are vertical accelerations.

7. Suspension system according to claim 6, wherein the amplifier and the low-pass filter have the same amplification factors.

8. Suspension system according to claim 6, wherein the amplifier has a larger amplification factor than the low-pass filter.

9. Suspension system according to claim 6, wherein the amplifier has a lower amplification factor than the low-pass filter.

* * * * *